No. 842,248. PATENTED JAN. 29, 1907.
A. F. ROCKWELL.
BRAKE MECHANISM.
APPLICATION FILED OCT. 30, 1905.
2 SHEETS—SHEET 1.
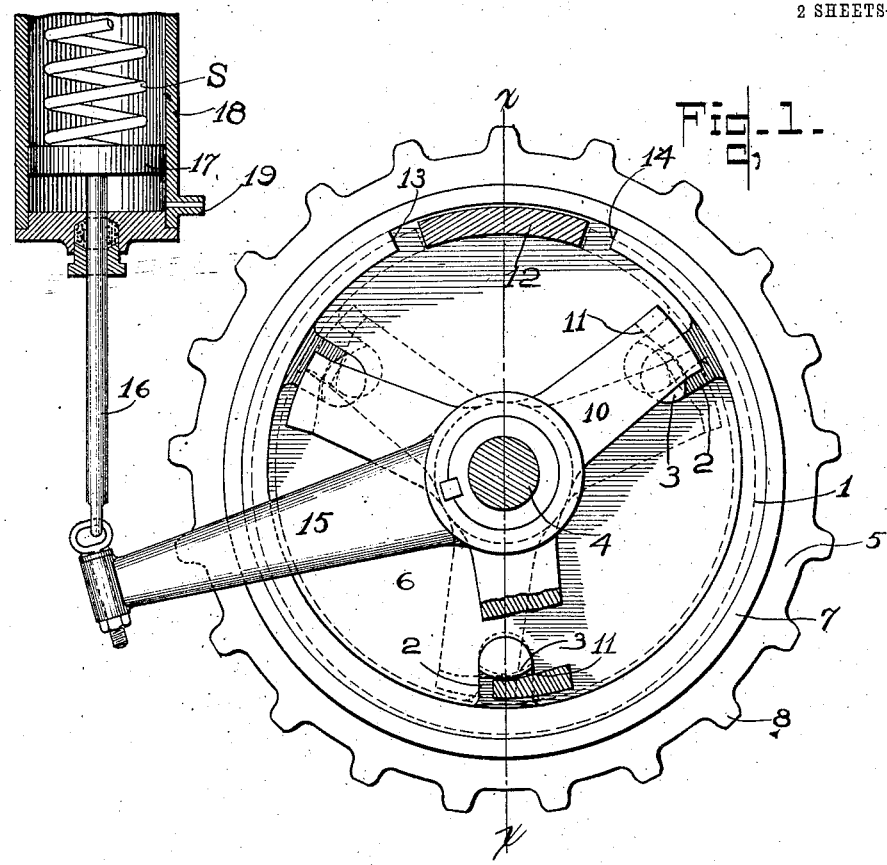
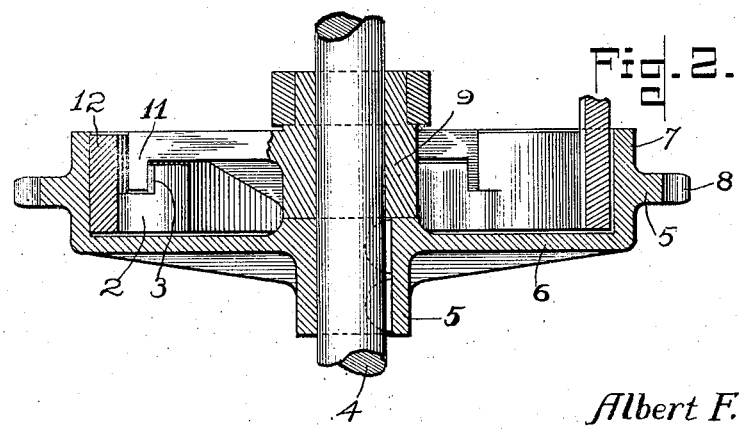
WITNESSES:
Chas. B. Crocker.
B. F. Funk.
Albert F. Rockwell.
INVENTOR.
BY Gales P. Moore.
ATTORNEY.

No. 842,248. PATENTED JAN. 29, 1907.
A. F. ROCKWELL.
BRAKE MECHANISM.
APPLICATION FILED OCT. 30, 1905.
2 SHEETS—SHEET 2.
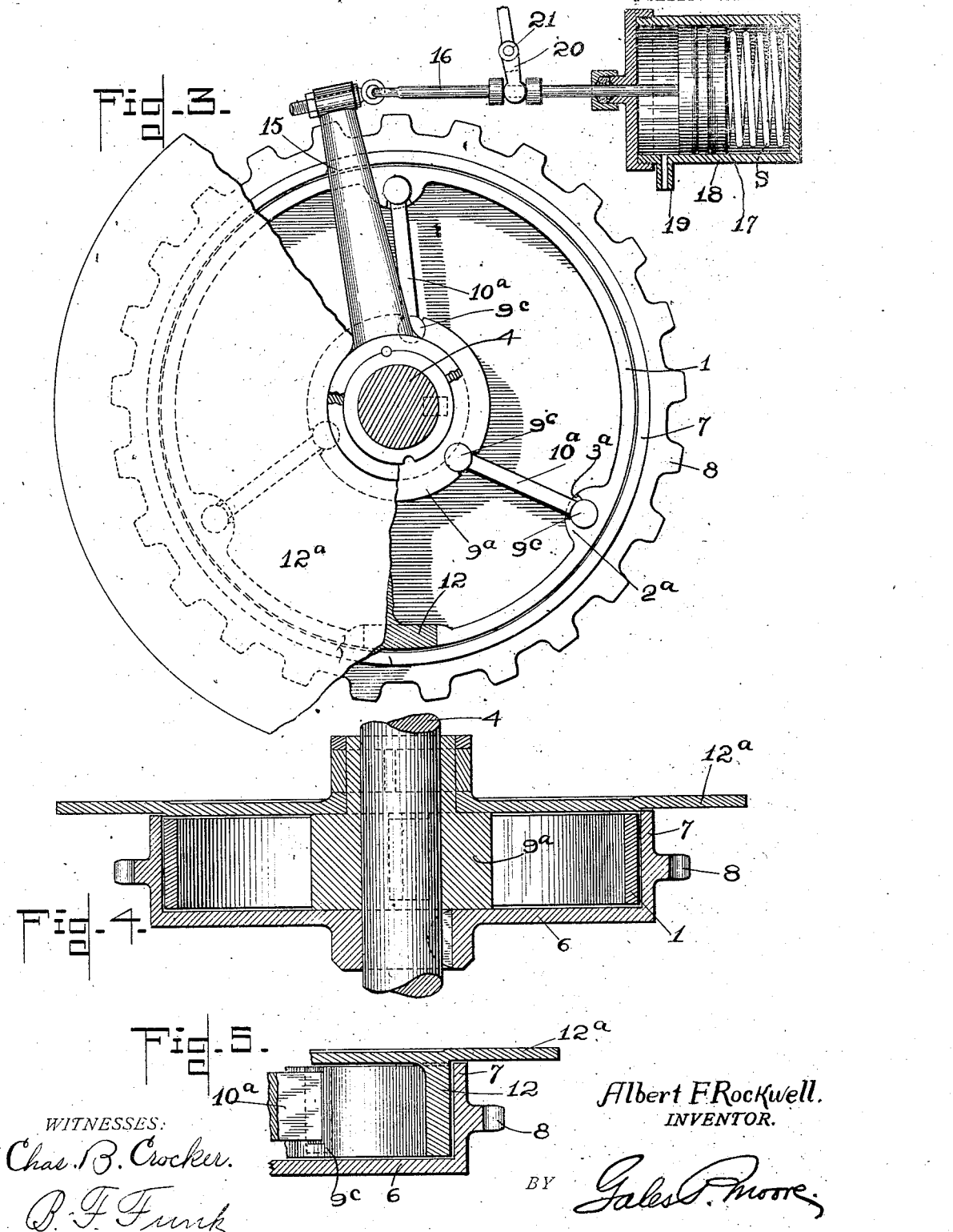
Albert F. Rockwell.
INVENTOR.
WITNESSES:
Chas. B. Crocker.
B. F. Funk.
BY Gales P. Moore
ATTORNEY.

UNITED STATES PATENT OFFICE.

ALBERT F. ROCKWELL, OF BRISTOL, CONNECTICUT, ASSIGNOR TO THE NEW DEPARTURE MANUFACTURING COMPANY, OF BRISTOL, CONNECTICUT, A CORPORATION OF CONNECTICUT.

BRAKE MECHANISM.

No. 842,248.  Specification of Letters Patent.  Patented Jan. 29, 1907.

Application filed October 30, 1905. Serial No. 285,210.

*To all whom it may concern:*

Be it known that I, ALBERT F. ROCKWELL, a citizen of the United States, residing at Bristol, county of Hartford, State of Connecticut, have invented a certain new and useful Brake Mechanism, of which the following is a full, clear, and exact description, such as will enable others skilled in the art to which it appertains to make and use the same, reference being had to the accompanying drawings, forming part of this specification.

This invention relates to means for retarding the movement of a movable part and for gradually preventing movement of the movable part under certain conditions.

In order to illustrate the application of the invention, I have shown it as applied to a driven shaft or axle. However, I do not limit myself to the exact organization of elements herein shown and described, as it is obvious that many forms of adjustment may be employed without departing from the spirit of the invention or sacrificing any of the advantages thereof.

In the drawings, Figure 1 is a plan view of my invention as applied, parts being shown in section. Fig. 2 is a sectional view on the line *x x* of Fig. 1. Fig. 3 is a view in plan of a slightly-modified form of the invention. Fig. 4 is a sectional view through a gear to which the invention is applied, and Fig. 5 is a fragmentary sectional view through the brake mechanism to illustrate the relative position of the abutment and its complementary parts.

In carrying out my invention I preferably employ a resilient ring having a natural expansive tendency. A convenient form of ring is illustrated in Fig. 1 as a split ring and designated by the reference-numeral 1. The ring may consist of a single piece, or it may be laminated, and in the form shown in Fig. 1 I have illustrated the ring as including a plurality of inwardly-disposed projections 2 having offsets or shoulders 3 therein, which offsets or shoulders are spaced suitable distances from the ring. Concentric with the ring is illustrated a shaft 4, to which shaft is keyed a cup-shaped gear 5, comprising the disk 6 with the peripheral flange 7 therein, which peripheral flange is provided with outstanding teeth 8, adapted to mesh with an adjacent gear or drive a sprocket-chain, according to the purpose for which it is to be used. Loose on the shaft 4 is a collar or hub 9, carrying a plurality of radial connecting devices, whereby the hub 9 and the ring 1 will be connected. In Fig. 1 the connecting devices are illustrated as arms 10, which are rigid on the hub or collar 9, and each of these arms carries a cam 11, the respective cams being adapted to engage the shoulders 3 on the projections 2.

12 designates a rigid abutment which is interposed between the respective ends 13 and 14 of the ring 1. It will be observed that the ring 1 is confined within the flange 7 of the gear 5 and that if the ring frictionally engages the flange 7 of the gear 5 the rotation of the gear will be retarded unless the ring is permitted to rotate. In view of the fact that the ring has a natural tendency to expand it will be necessary to contract it to permit the gear to rotate with the shaft 4, and a convenient way of contracting the ring 1 is to provide an arm 15 rigid on the collar 9, to which arm may be secured a piston-stem 16, connected to the piston 17 in the fluid-cylinder 18, having an inlet-opening 19, whereby fluid may be admitted into the cylinder to exert pressure against one face of the piston 17 in the manner common with such devices. As illustrated and connected to the collar 9, the ring would be incapable of exerting an efficient braking force against the rotatable element (viz., the gear) unless some means was provided for positively limiting rotation of the ring.

In order to limit the rotative movement of the ring, I have provided a rigid abutment 12, interposed between the ends 13 and 14 of the ring, so that irrespective of the direction of rotation one of the ends will butt against the abutment and further rotation will be prevented. It is to be understood that this device is capable of exerting a braking force upon the rotatable element irrespective of its direction of rotation. For example, it is my aim to provide a brake which will be capable of exerting a braking force irrespective of whether the gear is driven forwardly or rearwardly. It will be assumed that normally a fluid-pressure is exerted against the piston 17, so as to move the arm 15 in such a position as to cause the connecting devices 10 to ride their cams upon the shoulders of the inwardly-disposed projections 2, so as to cause the ring to contract. In this position the gear will be free to rotate in either direction without being hindered in any way by the ring. If it is desired to retard the movement of the gear, the pressure will be relieved from the cylinder, so that the normal expansive tendency of the ring will permit the shoulders 3 to ride off the cams on the arms 10, so that the ring will bind or effectually engage with the under face of the flange 7 of the gear 5. This binding or effectual engagement will permit the ring to be carried with the gear until one end (either 13 or 14) of the ring strikes against the abutment 12. The natural tendency of the ring to expand, together with the effectual engagement of the flange 7 of the gear therewith, will cause the ring and gear to become effectually engaged, so that the movement of the gear will be retarded. However, I prefer to arrange the ring so that the braking force ordinarily will be insufficient to suddenly stop the gear, but will cause it to gradually slow down. From references to the drawings it will be observed that it matters not in which direction the gear is rotated, the effect will be practically the same.

In Figs. 3 to 4 I have illustrated the ring 1 as having an inwardly-disposed projection 2$^a$, provided with sockets 3$^a$. The collar 9$^a$ is provided with sockets or recesses for the reception of the heads 9$^b$ of the connecting devices, (illustrated as links 10$^a$.) Heads 9$^c$ engage the recesses 3$^a$ in the projections 2$^a$. In the form illustrated in Figs. 3 to 5 the abutment 12 is carried by the rigid plate 12$^a$, which may be attached to some rigid part of the vehicle, so as to hold the abutment 12 always in the same relative position. In this latter form I have provided means for regulating the braking efficiency of the ring, so that the degree of resistance to the rotation of the gear by the band may be under control of the operator. A simple form of accomplishing this is illustrated in Figs. 3 to 5 as including the lever 20, fulcrumed at 21 and connected to the piston-rod below its fulcrum-point. This lever 20 may be operated in any convenient manner. By being under the control of the operator the ring (through the medium of the arm and hub and the connecting devices) may be governed so as to exert a braking force against the gear or other rotatable device, and thereby retard the rotation of the rotatable device, the resistance offered to the gear by the ring being dependent upon the will of the operator. For example, by actuating the lever 29 the expansive force of the ring may be controlled so as to partially frictionally engage the rotatable device in such a manner that the rotatable device will be permitted to rotate, the ring offering resistance to its rotation sufficiently to cause it to slow down without absolutely stopping the gear; but by permitting the ring to exert its entire expansive force against the gear, the latter will be caused to gradually slow down until it has stopped.

Under certain conditions I may find it advisable to interpose a spring S between one end of the cylinder and the piston 17 to insure the return of the piston toward a releasing position as soon as the air-pressure has been taken from the piston. While it may be unnecessary to utilize this spring in all instances, the introduction of the spring in the cylinder will tend to augment the release of the expansive ring by positively moving the arm 15 to release position through the medium of the piston and its stem.

From the foregoing description it will be apparent that an efficient resistance will be applied to the rotatable part when the braking element is applied irrespective of the direction of rotation of the rotatable element. The feature of this invention, which contributes largely to the result to be obtained, is the manner of arranging the band, so that if the rotatable element is rotating in one direction and the band is expanded said rotatable element will be engaged by said band and carry it a slight part of a rotation until one end of the band abuts against the abutment 12. The continued rotation of the rotatable element will have a tendency to assist in the expansion of the braking element, so as to assist in causing the braking element to be effective. If the rotatable element is rotating in an opposite direction, the other end of the ring or braking element will contact with the abutment, leaving the previously-contacted end of the braking element free. In the latter case the tendency of the band to expand will be the same, and this expansion will in a measure be augmented by the continued rotation of the rotatable element, so as to cause the ring to become effective irrespective of the direction of rotation of the rotatable element. In other words, the direction of rotation of the rotatable element is immaterial in so far as the effectiveness of the braking element is concerned. In either event, whether the rotatable element is moving in a forward direction or a rearward direction, the same condition will exist—to wit, the braking element will be caused to expand in the direction of rotation of the rotatable element—and in each instance it will have a relatively fixed portion and a relatively free portion. Hence it will be seen that the braking force may be as effectively exerted against the rotatable element in one direction as in the other.

What I claim is—

1. In a device of the class described, the combination with a rotatable part, of a braking element having an inherent expansive tendency to engage the rotatable part, and means for normally retracting the expansive element away from the rotatable part.

2. In a device of the class described, the combination with a rotatable element having a braking-face, of an expansive ring for engaging the braking-face, and means for normally retracting the expansive ring.

3. In a device of the class described, the combination with a gear having a circumferential flange, of a shaft for supporting said gear, a hub on said shaft, an expansive ring, and means connected to said hub and said ring for normally retracting said ring away from the flange on the gear which it is adapted to engage.

4. In a device of the class described, the combination with a gear having a circumferential flange, of a shaft for supporting said gear, a hub on said shaft, an expansive ring within the flange, connections between hub and ring, and means for partially rotating said hub on said shaft.

5. In a device of the class described, the combination with a rotative element having a circumferential flange, of an expansive ring within the flange and having a split portion providing two spaced ends, a rigid abutment between the spaced ends of the ring, and means for normally retracting said ring.

6. The combination with a movable element adapted to be braked, of a brake element which itself acts as a brake and has inherent in itself the tendency to move into braking position, and means for holding said brake element in retracted position.

7. The combination with a movable element, of a braking element therefor which itself acts as a brake and has inherent in itself the tendency to move into braking position, one of said elements lying about the other thereof, and means for holding said brake element in retracted position.

8. The combination with a movable element, of a brake element therefor which itself acts as a brake and has inherent in itself the tendency to move into braking position, one of said elements lying about the other, means for limiting the movement of the brake element in either of two directions, and means for holding said brake element in retracted position.

9. The combination with a rotative element having a braking-face, of an expansive ring for engaging said braking-face and having a split portion providing spaced ends, an abutment between the spaced ends of the ring, and means for normally retracting said ring.

10. In a device of the class described, the combination with a rotatable element having a braking-face, of an expansive ring for contacting with the braking-face to retard the movement of the rotatable element in either of two directions, and means for normally retracting the expansive ring.

11. In a device of the class described, the combination with a rotatable element having a braking-face, of an expansive ring for contacting with the braking-face, means for normally retracting the expansive ring, and means for controlling the resistance offered by the ring to the braking-face when the ring is released by the retracting means.

12. The combination with a movable element adapted to be braked, of a brake element which itself acts as a brake and has inherent in itself the tendency to move into braking position, means for holding said element in retracted position, and means for controlling the application of the brake element while it is applied.

13. The combination with a movable element adapted to be braked, of a brake element which itself acts as a brake and has inherent in itself the tendency to move into braking position, and a fluid-controlled means for holding said brake element in retracted position.

14. In a device of the class described, the combination with a rotatable element having a braking-face, of a shaft for supporting said rotatable element, a hub on said shaft, an expansive ring, and means connected to the said hub and said ring for normally retracting said ring away from the braking-face on the rotatable element which it is adapted to engage.

15. In a device of the class described, the combination with a rotatable element having a braking-face, of a shaft for supporting said rotatable element, a hub on said shaft, an expansive ring, and means carried by the hub for retracting said ring away from the braking-face on the rotatable element which it is adapted to engage.

16. In a device of the class described, the combination with a rotatable element having a braking-face, of a hub concentric with said rotatable element and having movement independent thereof, a ring for contact with the braking-face on the rotatable element, and means carried by the hub and having movement to retract the ring from engagement with the braking-face or permit it to engage said braking-face to brake the rotatable element in either of two directions of movement.

In testimony whereof I hereunto affix my signature in the presence of two witnesses.

ALBERT F. ROCKWELL.

Witnesses:
   JOSEPH D. BROWN,
   CLARA H. VOORHEES.